(12) United States Patent
Damadian et al.

(10) Patent No.: US 6,247,205 B1
(45) Date of Patent: Jun. 19, 2001

(54) APPARATUS TO ENABLE HANDS-FREE USE OF A LONG-DISTANCE MAGNIFYING DEVICE

(76) Inventors: Jevan A. Damadian, 33 Beacon La., East Northport, NY (US) 11731; John A. Linardos, 31 Winslow La., Smithtown, NY (US) 11787

( * ) Notice: Subject to any disclaimer, the term of this patent is extended or adjusted under 35 U.S.C. 154(b) by 0 days.

(21) Appl. No.: 09/251,349

(22) Filed: Feb. 17, 1999

(51) Int. Cl.7 .............................. A44B 21/00; A42B 1/20
(52) U.S. Cl. .............................. 24/3.12; 24/336; 24/3.3; 2/10; 351/155
(58) Field of Search ........................... 24/3.3, 3.8, 3.1, 24/3.12, 329, 335, 336; 2/10, 918; 351/155, 158; 248/902

(56) References Cited

U.S. PATENT DOCUMENTS

| | | | |
|---|---|---|---|
| 4,449,787 | * | 5/1984 | Burbo et al. .......................... 350/538 |
| 5,181,139 | * | 1/1993 | Benitez ............................. 351/155 X |
| 5,261,124 | * | 11/1993 | Day ........................................... 2/10 |
| 5,381,263 | * | 1/1995 | Nowak et al. ................... 351/158 X |
| 5,412,812 | * | 5/1995 | Gatchalian .................................. 2/10 |
| 5,471,259 | * | 11/1995 | Cahill .................................... 351/155 |
| 5,533,207 | * | 7/1996 | Diaz ........................................... 2/10 |
| 5,619,774 | * | 4/1997 | Perry ................................. 24/3.12 X |
| 5,687,458 | * | 11/1997 | Coker ..................................... 24/336 |
| 5,720,040 | * | 2/1998 | Simone ..................................... 2/10 |
| 5,987,640 | * | 11/1999 | Ryder ........................................ 2/10 |

* cited by examiner

Primary Examiner—Robert J. Sandy
(74) Attorney, Agent, or Firm—Rabin & Champagne, PC

(57) ABSTRACT

An apparatus for enabling hands-free use of a device for magnifying a long-distance event, such as binoculars, includes a base member, a first attachment member, and a second attachment member. The first attachment member is connected to the base member and is adapted to removably attach the apparatus to an article of headgear, such as a brimmed cap. The second attachment member is connected to the base member and is adapted to removably attach the apparatus to the magnifying device. The apparatus includes adjustable portions such as hinges so that the position of the binoculars may be adjusted by the user when the apparatus is attached to the cap.

18 Claims, 2 Drawing Sheets

APPARATUS TO ENABLE HANDS-FREE USE OF A LONG-DISTANCE MAGNIFYING DEVICE

FIELD OF THE INVENTION

The invention relates generally to functional accessories for headgear, and in particular to an attachment for a cap or other apparel worn on the head, which can be used to affix binoculars or any other vision-enhancing device to the cap for hands-free use of the device.

BACKGROUND OF THE INVENTION

Binoculars or other magnification devices have many applications. Such devices are commonly used at sporting and cultural events, as well as in hobbies such as birdwatching and in covert activities such as surveillance monitoring. During such activities, it is often inconvenient and tiring to continue to hold the binoculars throughout the activity. It is therefore beneficial to provide for continuous use of the binoculars while leaving the hands free to rest or perform other tasks.

Several inventions have addressed this need. For example, in U.S. Pat. No. 2,649,019, Hartline et al. disclose a contractible head mount for binoculars that was designed specifically for aviators. While this apparatus allows hands-free use of the binoculars, the device is cumbersome, and is designed to be used only with an aviator's helmet and with particular binoculars, which are attached. Thus, this apparatus is not suitable for use by the general public.

Rudenschöld (U.S. Pat. No. 5,131,093) discloses headgear having detachable binoculars that may be affixed below an elongated visor. While this apparatus is more likely to be worn by the general public, the particular headgear must still be worn, and the headgear is only adapted to receive the corresponding binoculars. Similarly, in U.S. Pat. No. 4,839,926, Choi discloses a visor with built-in binoculars, formed as a unitary assembly.

Goldstein (U.S. Pat. No. 5,282,086) and Benitez (U.S. Pat. No. 5,181,139) both disclose particular binocular designs suitable for attachment to and use with headgear. In both cases, the binoculars are fixed to the headgear by means of a hook and loop fastener or other attachment means. Thus, the user of these apparatus is not only restricted to the particular binoculars, but also to particular headgear, because the headgear must be permanently modified to accommodate the binoculars.

Sherlock et al. disclose, in U.S. Pat. No. 5,548,841, a headband magnifier. This apparatus includes a headband with a pivoting support for magnifying lenses. Although this apparatus can be fitted to anyone's head and is not dependent on the particular headgear worn, the pivoting support will only accommodate suitable lenses. Further, because only one set of objective lenses is used, this apparatus is most advantageously used for close work, that is, for magnifying small items and details close to the wearer. The apparatus is not suitable for viewing events at a distance.

Tonoyan et al. (U.S. Pat. No. 5,533,208) and Kelman et al. (U.S. Pat. No. 5,422,686) both disclose eyeglass assemblies for attachment to the visor of a cap. These assemblies are only suitable for use with sunglass lenses or, similar to the Sherlock et al. apparatus, lenses used for close work or reading. Further, because the lenses themselves must be accommodated by the assembly, only particular lenses may be used with these assemblies.

Thus, conventional hands-free binocular devices include the specific headgear, the specific binoculars or lenses, or both. Some are more adaptable to be used with any headgear or anyone's head, but these are not suited for use at events in which it is desirable to view far-away occurrences. It would be advantageous for a hands-free binocular device to be suitable for use with any visored headgear, so that the wearer could choose the headgear suitable to the event. It would also be advantageous for a hands-free binocular device to be suitable for use with any binoculars, so that the user could determine the level of expense and performance afforded by the selected binoculars.

SUMMARY OF THE INVENTION

It is therefore an objective of the present invention to provide an apparatus that allows hands-free use of any long-distance magnifying device, such as binoculars.

It is a further objective of the present invention to provide an apparatus that allows hands-free use of a long-distance magnifying device and that is adaptable to any brimmed or visored headgear.

It is an additional objective of the present invention to provide an apparatus that allows hands-free use of a long-distance magnifying device that is removably attachable to an item of headgear without requiring modification of the headgear.

The present invention is an apparatus for connecting such a magnifying device to an article of headgear. According to a first aspect of the invention, an apparatus for enabling hands-free use of a device for magnifying a long-distance event includes a base member, first attachment means, connected to the base member, for removably attaching the apparatus to an article of headgear, and second attachment means, connected to the base member, for removably attaching the apparatus to the magnifying device. The first attachment means may be a grip means for gripping a portion of the headgear. The second attachment means may be a clamp means for clamping the magnifying device. The base member may include adjustment means for adjusting the relative spatial position between the first attachment means and the second attachment means. The adjustment means may include pivot means.

According to a further aspect of the invention, an apparatus for enabling hands-free use of a device for magnifying a long-distance event includes a base member, a first attachment member, connected to the base member, adapted to removably attach the apparatus to an article of headgear, and a second attachment member, connected to the base member, adapted to removably attach the apparatus to the magnifying device. The first attachment member may be adapted to grip a portion of the headgear. The first attachment member may include a slotted portion adapted to receive a brim of the headgear. The slotted portion may include opposing members that exert a spring force toward each other when the brim is inserted therebetween. The first attachment member may be a clip. The second attachment member may be adapted to clamp the magnifying device. The second attachment member may be a clamp. The base member may include an adjustment member that is movable to adjust the relative spatial position between the first attachment member and the second attachment member. The base member may include a first section and a second section, and the adjustment member may include a hinge to provide a pivotal connection between the first base member section and the second base member section. The first attachment member may be pivotally attached to the base member. The second attachment member may be pivotally attached to the base member.

According to another aspect of the invention, an apparatus for enabling hands-free use of binoculars includes a base member, a first attachment member, pivotally connected to the base member, that is adapted to removably attach the apparatus to an article of headgear, and a second attachment member, pivotally connected to the base member, that is adapted to removably attach the apparatus to the binoculars. The first attachment member may be a clip. The second attachment member may be a clamp.

BRIEF DESCRIPTION OF THE DRAWINGS

The foregoing, and other objectives and advantages of the present invention will be understood by those of ordinary skill in the art on inspection of the following written description, in connection with the accompanying drawings, in which.

DETAILED DESCRIPTION OF THE PRESENT INVENTION

Figure 1:
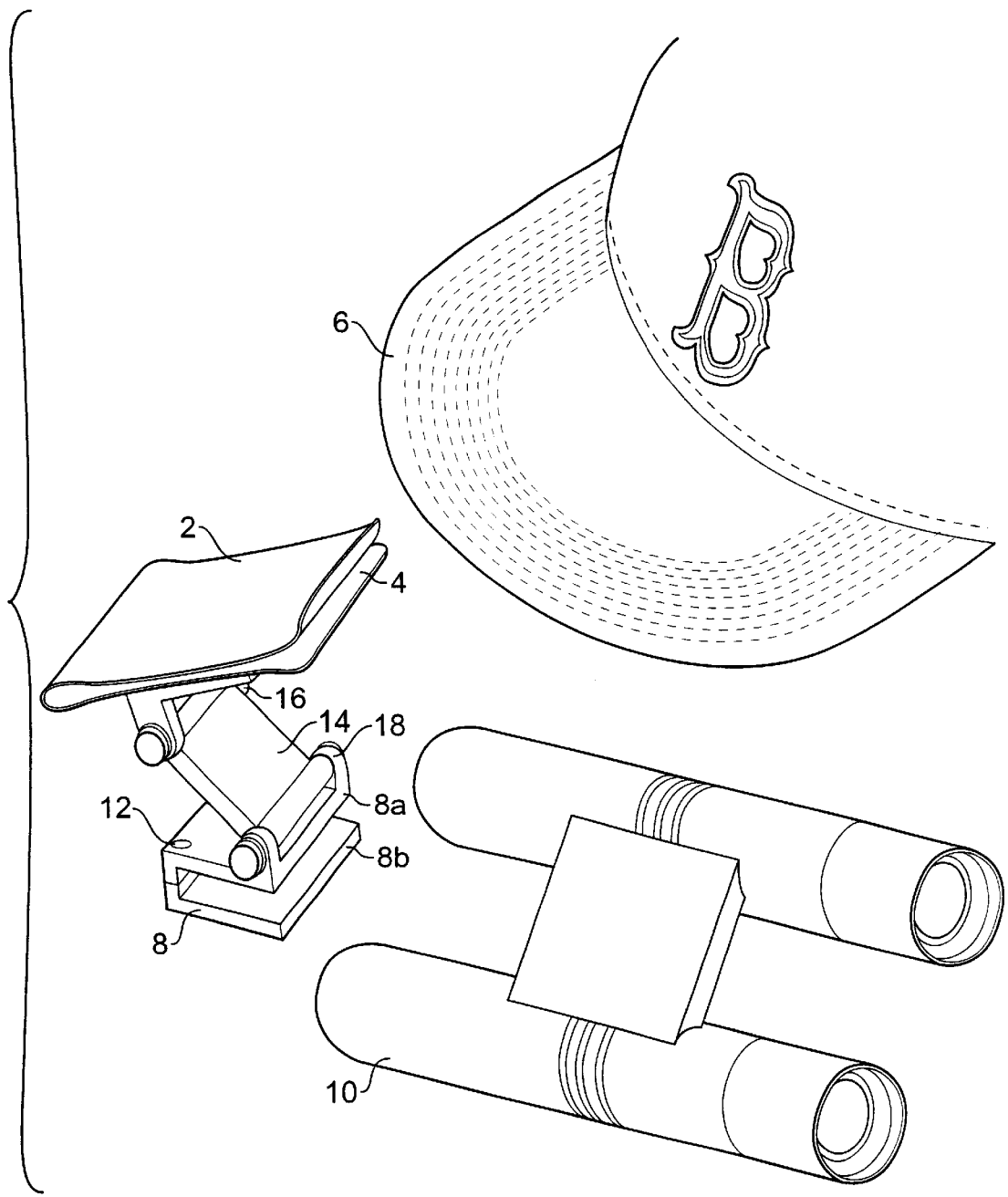
FIG. 1 shows an orthogonal view of a preferred embodiment of the present invention.
Figure 2:
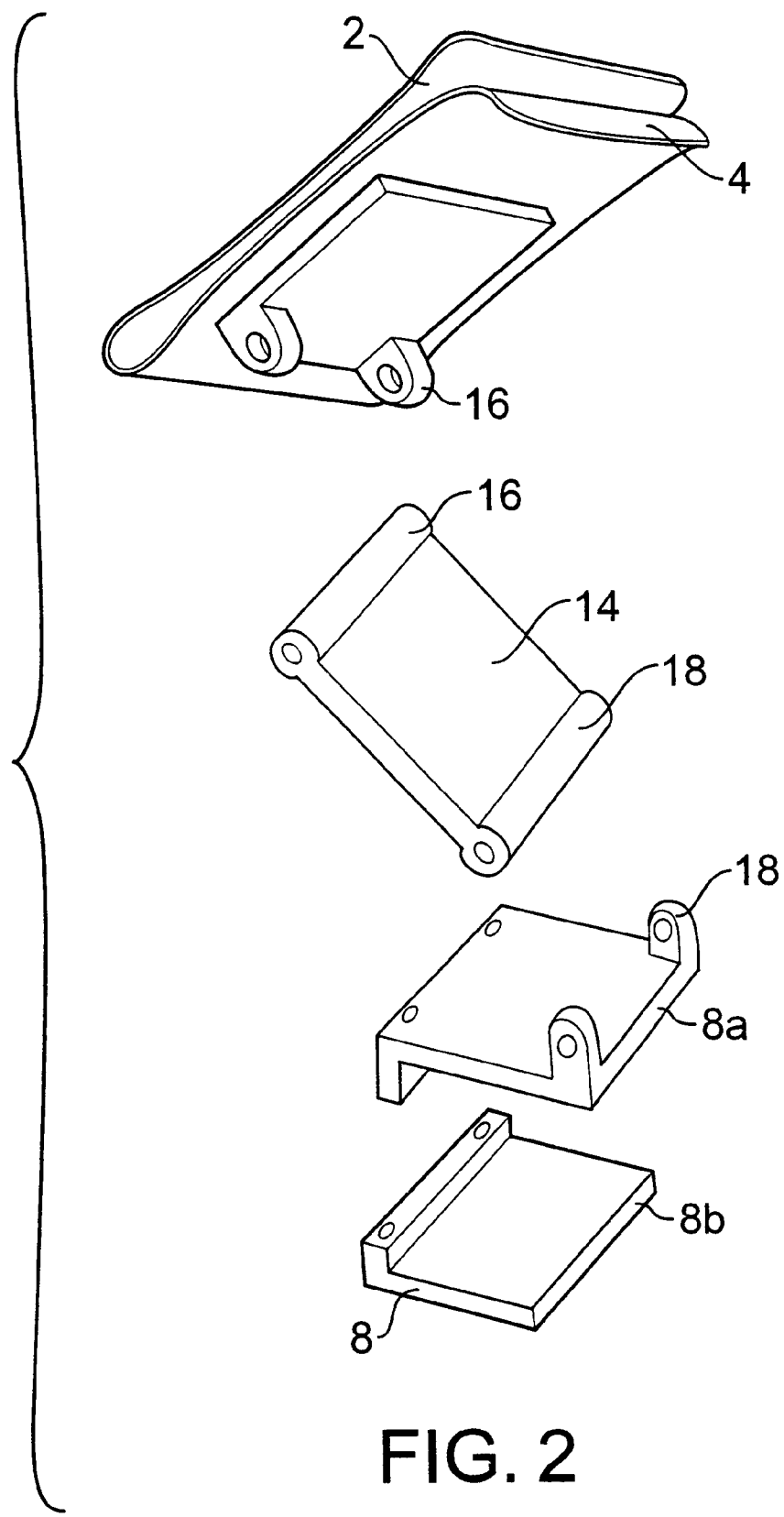
FIG. 2 shows an exploded view of a preferred embodiment of the present invention.

The present invention is an apparatus that is adapted to be attached to any headgear, such as a cap, preferably to the brim or bill of a cap. To this end the apparatus includes a first member for attaching the apparatus to the cap. The attachment member is removably attached to the cap, that is, the cap does not have to be modified to receive the attachment member, and the apparatus may be removed from the cap for use with another cap. Thus, the first attachment member may be any member that, for example, grips the brim of the cap. In the preferred embodiment, as shown in FIG. 1, the first attachment member 2 is a clip having a slotted portion 4 for receiving the brim 6. The clip should have enough spring force to securely grip the brim 6.

The apparatus also includes a second attachment member for securing a device for magnifying a long-distance event. It is contemplated that such device may be binoculars. The attachment member is removably attached to the binoculars, that is, the binoculars do not have to be modified to receive the attachment member, and the apparatus may be removed from the binoculars for use with any other binoculars. Thus, the second attachment member may be any member that, for example, securely holds the binoculars. In the preferred embodiment, the second attachment member 8 is a clamp that receives the binoculars 10. The clamp may be of any type that securely holds the binoculars 10. The exemplary clamp shown in FIG. 1 includes two portions 8a and 8b that are connected by screws 12, which may be tightened to adjust the grip of the clamp on the binoculars 10.

The first attachment member 2 and the second attachment member 8 may be connected directly together, such that when they are respectively connected to the cap and the binoculars, the user wearing the cap can observe a long-distance event through the binoculars. It is preferable, however, to facilitate adjustability of the apparatus to account for use with caps having different sized brims, for use with different sized binoculars, and for the comfort of different users.

Thus, the relative positions of the first attachment member and the second attachment member are preferably adjustable. In the preferred embodiment, such adjustability is provided by connecting a base member 14 between the first attachment member 2 and the second attachment member 8.

The first attachment member 2 may be movably connected to the base member 14, which in turn may be fixed in position with respect to the second attachment member 8. Alternatively, the second attachment member 8 may be movably connected to the base member, which in turn may be fixed in position with respect to the first attachment member 2. Preferably, both the first attachment member 2 and the second attachment member 8 are movably, and preferably pivotally, attached to the base member 14.

This pivotal attachment may be provided by forming the base member in two sections connected by a pivot connection, where the first section is connected to the first attachment member and the second section 20 b is attached to the second attachment member. Preferably, the base member 14 is a single rigid piece, and includes first and second hinge connections 16, 18 connecting the first attachment member 2 and the second attachment member 8, respectively, to the base member 14.

Thus, the invention as described provides a removable, reusable, adjustable apparatus for connecting binoculars to a cap. The apparatus may be used with any cap, and with any binoculars, and may be adjusted to suit any user.

General, preferred, and alternative embodiments of the present invention have now been presented in detail. Although the written description has described the invention by presenting exemplary embodiments, and the drawings have shown these embodiments, the invention is not limited to the particular structures and materials described herein. Rather, the scope of the invention includes all equivalents of the structure and materials described herein, as set forth in the appended claims.

What is claimed is:

1. An apparatus for enabling hands-free use of a device for magnifying a long-distance event, comprising:

a base member;

integral attachment means, connected to the base member, for removably attaching the apparatus to an article of headgear worn by a user; and second attachment means, connected to the base member, for removably attaching the apparatus to the magnifying device such that the magnifying device can be used by the user while the user is wearing the headgear;

wherein the base member includes adjustment means for adjusting the relative spatial position between the integral attachment means and the second attachment means; and wherein the adjustment means includes pivot means for providing a pivotal relation between the integral attachment means and the second attachment means.

2. The apparatus of claim 1, wherein the integral attachment means is a grip means for gripping a portion of the headgear.

3. The apparatus of claim 1, wherein the second attachment means is a clamp means for clamping the magnifying device.

4. An apparatus for enabling hands-free use of a device for magnifying a long-distance event, comprising:

a base member;

an integral attachment member, connected to the base member, adapted to removably attach the apparatus to an article of headgear worn by a user; and a second attachment member, connected to the base member, adapted to removably attach the apparatus to the magnifying device such that the magnifying device can be used by the user while the user is wearing the headgear;

wherein the base member includes an adjustment member that is movable to adjust the relative spatial position between the integral attachment member and the second attachment member.

5. The apparatus of claim 1, wherein the integral attachment means includes a portion adapted to receive a brim of the headgear.

6. The apparatus of claim 4, wherein the adjustment member includes a hinge to provide a pivotal connection between the base member and the second attachment member.

7. The apparatus of claim 4, wherein the integral attachment member is adapted to grip a portion of the headgear.

8. The apparatus of claim 7, wherein the integral attachment member includes a slotted portion adapted to receive a brim of the headgear.

9. The apparatus of claim 8, wherein the slotted portion includes opposing members that exert a spring force toward each other when the brim is inserted therebetween.

10. The apparatus of claim 4, wherein the integral attachment member is a clip.

11. The apparatus of claim 4, wherein the second attachment member is adapted to clamp the magnifying device.

12. The apparatus of claim 4, wherein the second attachment member is a clamp.

13. The apparatus of claim 12, wherein the clamp includes a first clamp member and a second clamp member.

14. The apparatus of claim 13, wherein the first clamp member and the second clamp member are attached by screws.

15. The apparatus of claim 14, wherein the screws attach the first clamp member and the second clamp member such that the grip of the clamp is adjustable.

16. The apparatus of claim 4, wherein the second attachment member is pivotally attached to the base member.

17. The apparatus of claim 4, wherein the adjustment member includes a hinge to provide a pivotal connection between the base member and the integral attachment member.

18. The apparatus of claim 4, wherein the integral attachment member is pivotally attached to the base member.

* * * * *